(12) United States Patent
Hill et al.

(10) Patent No.: US 9,764,987 B2
(45) Date of Patent: Sep. 19, 2017

(54) COMPOSITE CERAMICS AND CERAMIC PARTICLES AND METHOD FOR PRODUCING CERAMIC PARTICLES AND BULK CERAMIC PARTICLES

(71) Applicant: Dynamic Material Systems, LLC, Oviedo, FL (US)

(72) Inventors: Arnold Hill, Orlando, FL (US); William Easter, Oviedo, FL (US)

(73) Assignee: Dynamic Material Systems, LLC, Oviedo, FL (US)

( * ) Notice: Subject to any disclaimer, the term of this patent is extended or adjusted under 35 U.S.C. 154(b) by 0 days.

(21) Appl. No.: 14/858,096

(22) Filed: Sep. 18, 2015

(65) Prior Publication Data

US 2017/0001915 A1 Jan. 5, 2017

Related U.S. Application Data

(60) Continuation-in-part of application No. 14/598,658, filed on Jan. 16, 2015, now Pat. No. 9,434,653, which
(Continued)

(51) Int. Cl.
*C04B 35/597* (2006.01)
*C04B 35/584* (2006.01)
(Continued)

(52) U.S. Cl.
CPC ........ *C04B 35/597* (2013.01); *C04B 35/5603* (2013.01); *C04B 35/565* (2013.01);
(Continued)

(58) Field of Classification Search
CPC ...... C04B 35/00; C04B 35/571; C04B 35/589
See application file for complete search history.

(56) References Cited

U.S. PATENT DOCUMENTS 6,680,013 B1 1/2004 Stein
8,119,057 B2 2/2012 Fei
(Continued)

OTHER PUBLICATIONS

Colombo, et al., Polymer-Derived Ceramics: 40 Years of Research and Innovation in Advanced Ceramics, J. Am. Ceram. Soc., 2010, pp. 1805-1837, vol. 93, No. 7.
(Continued)

*Primary Examiner* — Alexandre Ferre
(74) *Attorney, Agent, or Firm* — Brian S. Steinberger; Law Office of Brian S. Steinberger, P.A.

(57) ABSTRACT

Methods for producing Polymer Derived Ceramic (PDCs) particles and bulk ceramic components and compositions from partially cured gelatinous polymer ceramic precursors and unique bulk composite PDC ceramics and unique PDC ceramic particles in size and composition. Methods of making fully dense PDCs over approximately 2 μm to approximately 300 mm in diameter for applications such as but not limited to proppants, hybrid ball bearings, catalysts, and the like. Methods can include emulsion processes or spray processes to produce PDCs. The ceramic particles and compositions can be shaped and chemically and materially augmented with enhancement particles in the liquid resin or gelatinous polymeric state before being pyrolyzed into ceramic components. The resulting ceramic components have a very smooth surface and are fully dense, not porous as ceramic components from the sol-gel process.

10 Claims, 5 Drawing Sheets

Related U.S. Application Data is a division of application No. 13/775,594, filed on Feb. 25, 2013, now Pat. No. 8,961,840.

(60) Provisional application No. 62/053,479, filed on Sep. 22, 2014, provisional application No. 61/606,007, filed on Mar. 2, 2012.

(51) Int. Cl.

| | | |
|---|---|---|
| *C10M 159/00* | (2006.01) | |
| *C04B 35/583* | (2006.01) | |
| *C09K 8/80* | (2006.01) | |
| *C04B 35/56* | (2006.01) | |
| *C04B 35/565* | (2006.01) | |
| *C04B 35/571* | (2006.01) | |
| *C04B 35/589* | (2006.01) | |
| *C04B 35/626* | (2006.01) | |
| *C04B 38/00* | (2006.01) | |
| *C04B 35/58* | (2006.01) | |

(52) U.S. Cl.
CPC ............ *C04B 35/571* (2013.01); *C04B 35/58* (2013.01); *C04B 35/583* (2013.01); *C04B 35/584* (2013.01); *C04B 35/589* (2013.01); *C04B 35/6269* (2013.01); *C04B 35/62695* (2013.01); *C04B 38/008* (2013.01); *C09K 8/805* (2013.01); *C10M 159/00* (2013.01); *C04B 2235/483* (2013.01); *C04B 2235/602* (2013.01); *C04B 2235/6028* (2013.01); *C04B 2235/77* (2013.01); *C04B 2235/95* (2013.01)

(56) References Cited

U.S. PATENT DOCUMENTS

| | | |
|---|---|---|
| 8,293,048 B2 | 10/2012 | Fei |
| 8,961,840 B1 | 2/2015 | Hill |
| 2004/0048731 A1 | 3/2004 | Kim |
| 2004/0138046 A1 | 7/2004 | Sherwood, Jr. |
| 2005/0036931 A1 | 2/2005 | Garcia |
| 2006/0069176 A1 | 3/2006 | Bowman |
| 2011/0319252 A1* | 12/2011 | Schmidt ............ C04B 35/62892 501/2 |
| 2012/0178618 A1 | 7/2012 | Vinu |
| 2012/0234681 A1 | 9/2012 | Lomasney |
| 2014/0202125 A1 | 7/2014 | Kobashi |
| 2014/0274658 A1* | 9/2014 | Sherwood ............ C08G 77/20 501/154 |

OTHER PUBLICATIONS

Ye, et al., Ceramic Microparticles and Capsules via Microfluidic Processing of a Preceramic Polymer, J. R. Soc. Interface, 2010, pp. 1-13.

Kleebe, et al., Decomposition-Crystallization of Polymer-Derived Si—C—N Ceramics, Journal of the American Society, 1998, pp. 2971-2977, vol. 81, No. 11.

\* cited by examiner

COMPOSITE CERAMICS AND CERAMIC PARTICLES AND METHOD FOR PRODUCING CERAMIC PARTICLES AND BULK CERAMIC PARTICLES

CROSS REFERENCE TO RELATED APPLICATIONS

This application claims the benefit of priority to U.S. Provisional Patent Application Ser. No. 62/053,479 filed Sep. 22, 2014, and this application is a Continuation In Part of U.S. patent application Ser. No. 14/598,658 filed Jan. 16, 2014, now U.S. Pat. No. 9,434,653 which is a Divisional of U.S. patent application Ser. No. 13/775,594 filed Feb. 25, 2013, now U.S. Pat. No. 8,961,840, which claims the benefit of priority to U.S. Provisional Application Ser. No. 61/606,007 filed Mar. 2, 2012. The entire disclosure of each applications is incorporated herein by specific reference thereto.

FIELD OF INVENTION

This invention relates to ceramics and ceramic particles and compositions, and in particular to composite Polymer Derived Ceramics (PDCs) and polymer derived ceramic (PDC) particles and compositions, and methods for producing ceramic PDC particles fully dense sizes of over 300 μm.

BACKGROUND AND PRIOR ART

Polymer derived ceramics (PDCS) have been developed over the last 30 years and have been processed into bulk or macroporous components. PDCs are becoming increasingly popular in applications involving high-temperature resistant materials, hard materials, chemical engineering applications or functional materials in electrical engineering as well as in micro/nanoelectronics. See Colombo et al., Polymer-Derived Ceramics: 40 Years of Research and Innovation in Advanced Ceramics, *Journal of the American Ceramic Society*, Vol. 93, No. 7, 2010, pages 1805-1837.

Sol-gel and Flame pyrolysis are typically used to make typical ceramic particles, and using an emulsion process has been known to make small size particles.

In a paper by Congwang Ye et al ("Ceramic microparticles and capsules via microfluidic processing of a pre-ceramic polymer") *Journal of the Royal Society Interface* 6 Aug. 2010 vol 7 Supp 4 S461-473, Ye describes a laboratory emulsion process which produces oxycarbide particles in the 30-180 μm range. The problems with this laboratory technology include non-manufacturability due to tedious washing schemes and the use of partially cross-linked resins in the emulsion phase which will produce inconsistent products and poorer quality particles which will not be able to be produced above the 200 micron size range.

Larger beads, particles, balls made with porosity have been made but not any that are fully dense in the size ranges over approximately 300 μm.

Fully dense particles/beads/balls do not have porosity or the flaws of porous particles which should allow for better surface characteristics in terms of roughness and reduction of crack propagation.

The current developments of PDCs does not enable making PDCs to be fully dense in sizes over approximately 200 μm to approximately 300 μm.

Thus, the need exists for producing PDC particles in high volume manufacturing as well as producing unique particles in terms of size (large PDC particles) and unique in terms of composition.

SUMMARY OF THE INVENTION

A primary objective of the present invention is to provide large Polymer Derived Ceramic (PDC) particles and compositions from approximately 200 μm to approximately 100 mm in diameter and methods of making the particles and compositions having a new and novel composition from a variety of polymer derived ceramic resins using emulsion processing.

A secondary objective of the present invention is to provide large Polymer Derived Ceramic (PDC) particles and compositions from approximately 200 μm to approximately 100 mm in diameter and methods of making these particles and compositions having a new and novel composition from various polymer derived ceramic resins, which are not produced with flame pyrolysis or typical sol-gel processes.

A third objective of the present invention is to provide Polymer Derived Ceramic (PDC) particles and compositions from approximately 10 nm to approximately 100 mm in diameter having a new and novel composition from a variety of polymer derived ceramic resins using emulsion processing.

A fourth objective of the present invention is to provide Polymer Derived Ceramic (PDC) particles and compositions from approximately 10 nm to approximately 100 mm in diameter having a new and novel composition from a variety of polymer derived ceramic resins which are not produced with flame pyrolysis or typical sol-gel processes.

A fifth objective of the present invention is to provide Polymer Derived Ceramics (PDCs) and methods of forming PDCs having a new and novel composition from an emulsion process formed into ball shapes having a sphericity which is less costly than current ball grinding processes.

A sixth objective of the present invention is to provide Polymer Derived Ceramics (PDCs) and methods of forming PDCs from an emulsion process having very small particle sizes of approximately 0.001 to approximately 10 micron with a very tight distribution. This process will involve using the emulsion process with droplet injection or mechanical shaping (grinding) of the cured polymer bead. (The cryomilling of a green body is one embodiment of mechanical shaping.)

Preferably, a polymer derived ceramic (PDC) particle of the present invention is a fully dense PDC particle formed from a gelatinous polymer ceramic precursor material having a plurality of enhancement particles attached to and incorporated in the structure of the gelatinous polymer ceramic precursor material with an overall particle size of approximately 0.1 mm to approximately 300 mm in diameter.

Preferably, the polymer derived ceramic (PDC) particle of the present invention has a plurality of enhancement particles attached to the structure of the gelatinous polymer ceramic precursor material including at least one coating of a functional material coated on the surface of the gelatinous precursor material and a second coating of a second functional material coated on the surface of a fully cured gelatinous polymer ceramic precursor material that has one coating of a functional material, thereby forming an enhanced multilayered ceramic particle.

It is also preferred that the polymer derived ceramic (PDC) particle of the present invention have a plurality of enhancement particles selected from functional materials that include a metallic powder, a ceramic powder, graphite powder, graphene powder, diamond powder, carbide powder, silicide powder, nitride powder, oxide powder, carbon nanotubes and mixtures thereof.

Preferably, a polymer derived ceramic (PDC) particle of the present invention has a density range of approximately 1.7 to approximately 3.4 g/cc.

Further, it is preferred that the polymer derived ceramic (PDC) particle of the present invention is used for a proppant in fracking oil and gas well, or for a ball bearing.

It is also preferred that the polymer derived ceramic (PDC) particle material is derived from at least one of the following binary systems: a BN PDC System, a SiC PDC System; ternary systems: a SiOC PDC System, a SiCN PDC System; and the following quaternary systems: a Si—Ti—C—O PDC System, a Si—Al—C—O PDC System, a Si—B—C—N PDC System and a Si—Al—O—N PDC System.

A preferred method of making a plurality of polymer derived ceramic (PDC) particles in an emulsion process includes providing a liquid pre-catalyzed polymeric ceramic precursor resin, introducing the precursor resin to a continuous phase liquid emulsion, exposing the continuous phase liquid emulsion containing the precursor resin to an energy source, curing the precursor resin to form a partially cured gelatinous polymer, mixing a plurality of enhancement particles with the continuous phase liquid emulsion containing the partially cured gelatinous polymer, coating the partially cured gelatinous polymer with enhancement particles, separating the coated partially cured gelatinous polymer from the continuous phase liquid emulsion; and pyrolizing the coated partially cured gelatinous polymer to produce a plurality of enhanced polymer derived ceramic (PDC) particles.

It is also preferred to mix the liquid pre-catalyzed polymeric ceramic precursor resin of the present invention with a plurality of enhancement particles before introducing the precursor resin to the continuous phase liquid emulsion.

In the emulsion process herein, it is preferred to repeat enhancement coating steps multiple times to create multiple layers of enhancement particles on a coated partially cured gelatinous polymer forming an onion-like, layered, multifunctional composite that is fully cured and then pyrolyzed to produce a unique, novel enhanced polymer derived ceramic (PDC) particle.

Another preferred method of making a plurality of polymer derived ceramic (PDC) particles uses a spray process that includes providing a curing chamber with a top opening, side walls, a bottom opening and an energy source, introducing a liquid pre-catalyzed polymeric ceramic precursor resin into the top opening of the chamber, exposing the precursor resin to the energy source in the chamber, curing the precursor resin to form a partially cured gelatinous polymer, spraying a plurality of enhancement particles into the chamber containing the partially cured gelatinous polymer, coating the partially cured gelatinous polymer with the enhancement particles, collecting the coated partially cured gelatinous polymer from the bottom opening of the chamber; and pyrolizing the coated partially cured gelatinous polymer to produce a plurality of enhanced polymer derived ceramic (PDC) particles.

It is also preferred to mix a liquid pre-catalyzed polymeric ceramic precursor resin with a plurality of enhancement particles before the precursor resin is introduced into the top opening of the curing chamber.

The preferred enhancement particles used to make the polymer derived ceramic (PDC) particles herein are selected functional materials including, but not limited to, a metallic powder, a ceramic powder, graphite powder, graphene powder, diamond powder, carbide powder, silicide powder, nitride powder, oxide powder, carbon nanotubes and mixtures thereof.

Emulsions are mixtures of two or more liquids that are separated by electrostatic forces and surface tension. The micelles are created by a surfactant lowering the interfacial tension. The micelles are very spherical and have a very smooth surface. The micelles are non-porous.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The invention includes particles and particles produced from Gelatinous Polymer Ceramic Precursors over 3 mm in diameter. The present invention describes SiOC particles/beads/balls that are fully dense particles over 3 mm diameter which were not known prior to this invention. In addition, the SiOC particle/bead/ball itself in terms of properties and structure, other materials can be added in the polymer state to make unique, one of a kind, ceramic particles/balls/beads.

Fully dense particles/beads/balls do not have porosity or the flaws of porous particles which should allow for better surface characteristics in terms of roughness and reduction of crack propagation. Larger beads, particles, balls made with porosity have been made but not any that are fully dense in the size ranges of this invention.

In addition, we can use these unique particles/beads/balls to make unique bulk structures such as those described in U.S. patent application Ser. No. 13/775,594 filed Feb. 25, 2013, which claims the benefit of priority to U.S. Provisional Application Ser. No. 61/606,007 filed Mar. 2, 2012, both of which are incorporated by reference.

These large fully dense particles have not been made before. "The polymer-to-ceramic conversion occurs with gas release, (isotropic) volume shrinkage (20-30%, linear shrinkage) and formation of porosity (micro and macro). This typically leads to large defects, such as cracks or pores, which make the direct conversion of a preceramic part to a dense ceramic virtually unachievable, unless its dimension is typically below a few hundred micrometers (as in the case of fibers, coatings, or foams)." See Colombo et al., Polymer-Derived Ceramics: 40 Years of Research and Innovation in Advanced Ceramics, *Journal of the American Ceramic Society*, Vol. 93, No. 7, 2010, pages 1805-1837.

The subject invention covers enhancements to the structure and properties of gelatinous globules of partially cured pre-ceramic polymer precursors described in U.S. patent application Ser. No. 13/775,594 filed Feb. 25, 2013, which is incorporated by reference.

The parent application, U.S. patent application Ser. No. 13/775,594 (now U.S. Pat. No. 8,961,840) teaches, "It is important that the droplets not be 100% cured because they will not be able to form chemical bonds to each other which means they will not convert to a single continuous ceramic body."

In the parent application, supra, methods were described to produce partially cured globules or spheres of pre-ceramic polymer precursors. These globules or spheres were then agglomerated to form large bulk 3D shapes which were then cured to completion. After full curing the individual spheres are chemically bonded together and when fired will produce a single continuous ceramic part where the previous individual spheres are indistinguishable.

In the present invention, the term "enhancements" or "enhancement particles" is used to describe materials added to both the liquid resin and the partially cured globules described herein or added only to the partially cured globules. The enhancement step entails adding singular or multiple functional materials to the liquid pre-catalyzed polymeric ceramic precursor resin and also to the surface of the gelatinous globules while they are sticky due to their partially cured state. For example, ceramic or metallic powders of various sizes are added to the liquid precursor resin and can also be pressed or embedded into the sticky surface of the globules which would then be taken to a state of full cure thus incorporating the powders inside the resin and bonding the powders securely onto the surface of the globules.

The parent application, U.S. patent application Ser. No. 13/775,594 (now U.S. Pat. No. 8,961,840), incorporated herein by reference, teaches, "If desired the pre-ceramic resins could be co-sprayed with an inert filler that would burn out during firing. This would allow the spheres to be highly compacted without completely closing up the space between them. If desired the inert filler could be a metal powder where the metal would melt/sinter together and form a metal ceramic composite that could be made quickly and easily and with very uniform properties."

Examples of other functional materials that could be added to the surface of the globules are graphite powder, graphene powder, diamond powder, carbides, silicides, nitrides, oxides and carbon nanotubes among others. The globules can then be re-coated with fresh uncured pre-ceramic polymer precursors of the same type or a different type. Then the freshly re-wetted globules can then be packed into a mold. Followed by the molded agglomeration of wet, powder coated globules could be taken to the fully cured state and then pyrolyzed to ceramic.

In addition to or instead of adding powdered materials to the outer surface of the globules, the same materials including nano-scale versions of these materials could be added to the pre-ceramic polymer precursors prior to them being formed into the globules or during globule formation. Also in addition to or instead of adding powdered materials to the outside surfaces of the globules, the surfaces could be coated with pre-ceramic polymer precursors of different families which give rise to different ceramics than the ceramic produced by the pre-ceramic polymer precursor that was used to produce the initial globules. After the globules are coated with a different pre-ceramic polymer precursor they would be taken to the fully cured state. This process could be repeated multiple times while alternating the pre-ceramic polymer precursors such that one would end up with an onion like structure. These multi functionalized globules could be agglomerated together and pyrolyzed to produce bulk ceramic products with unique properties as described in U.S. patent application Ser. No. 13/775,594 filed Feb. 25, 2013, which is incorporated by reference, or they could be directly pyrolyzed into functionalized ceramic particles.

Advantages of these methods over typical ceramic particle formation include lower cost to produce spherical shaped particles (elimination of or severely reducing mechanical operations to get the sizes needed), less energy to produce the particles, reduced manufacturing time as well as producing unique sizes, shapes and compositions that cannot be produced with current particle manufacturing techniques.

Figure 1:
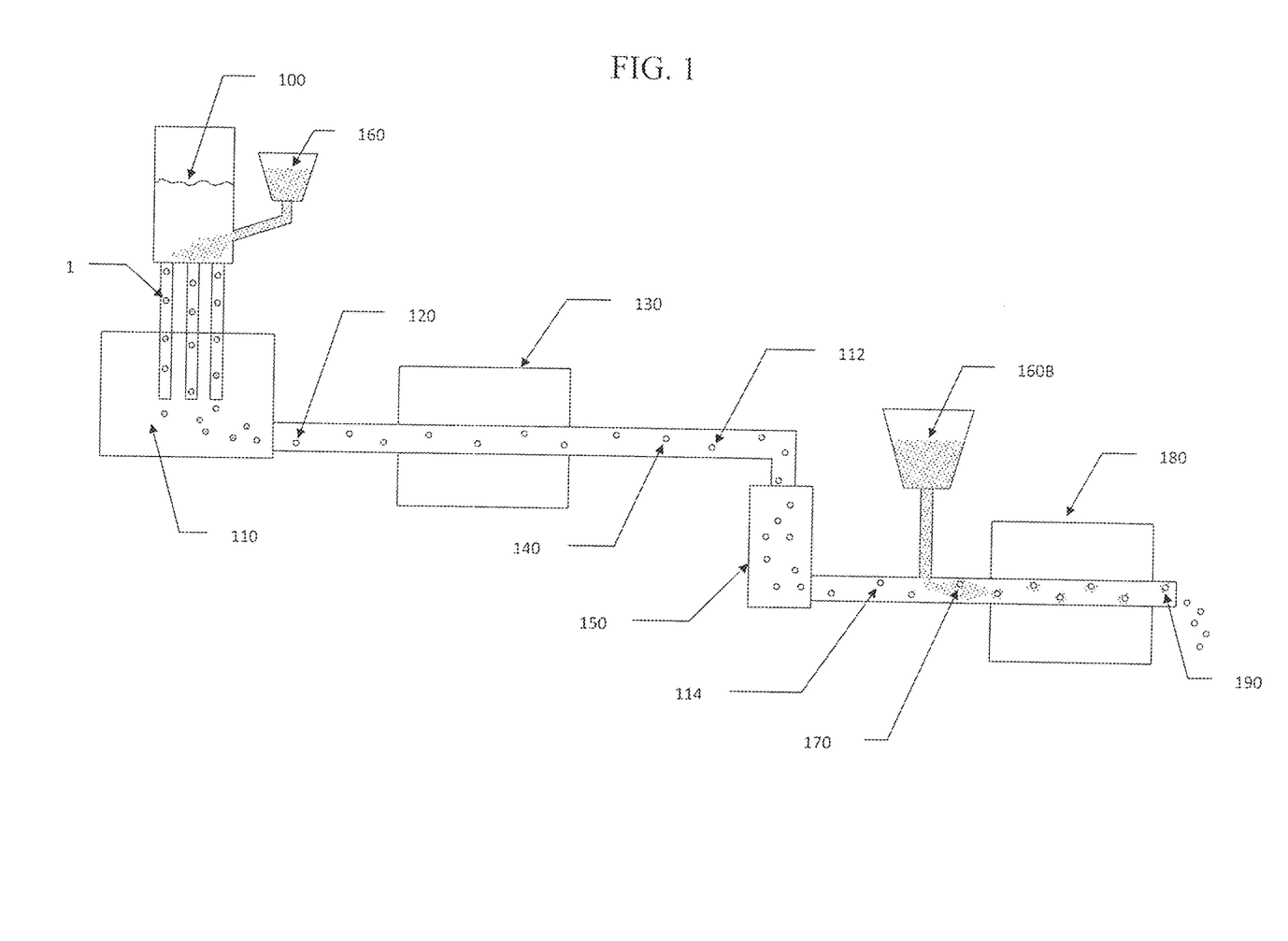
FIG. 1 shows a process for making polymer derived ceramic (PDC) particles using an emulsion process.

FIG. 1 shows a process for making polymer derived ceramic (PDC) particles using an emulsion process. The production of enhanced ceramic particles via the emulsion process begins by direct injection of a liquid pre-catalyzed polymeric ceramic precursor resin 100, into an emulsifying secondary continuous phase liquid 110 that is immiscible with the resin. Enhancement particles 160 can be added to the liquid precursor resin 100 at this stage of the process to incorporate functional materials in the precursor resin to produce a unique, functionalized composition. The injection of the precursor resin 100 with or without the enhancement particles 160 can be added by a spray nozzle or simply poured in, however; the preferred embodiment is to use an ultrasonic powered droplet generator 1 which can be a custom built system that takes advantage of Rayleigh instabilities generated in a fluid stream by ultrasonic perturbations. Ultrasound powered droplet generators typically generate droplets that are about 150 μm in diameter at a rate of 80-100 kHz, but frequencies of up to 1 MHz and droplet sizes ranging from 6 μm to 1 mm in diameter are known. The use of such a generator allows for the production of liquid droplets 120 with a very tight size distribution and in high volume. Since the two liquids are immiscible, they won't mix to produce a solution. Instead, the resin 100 with or without the enhancement particles 160 will stay in droplet form 120 while circulating in the continuous phase liquid 110.

To help ensure stability of the emulsion, surfactants can be added to the continuous phase liquid 110 that reduce the interfacial tension between the two liquids. Examples of surfactants are PEG-12, TWEEN, and Triton-100 among others. Examples of the continuous phase liquid 110 are glycerin, propylene glycol, ethylene glycol and fluorinated liquid polymer oils among others. Induced currents in the continuous phase liquid 110 prevent the resin droplets 120 from coagulating and floating to the surface.

The continuous phase liquid 110 is then heated in a container 130 by techniques such as, but not limited to, open flame, electric heating elements or electromagnetic radiation such as infrared or microwaves. As the temperature of the continuous phase liquid 110 rises, the resin droplets 120 are cured to a gel state or a solid in a controlled manner.

In the embodiment shown in FIG. 1, the resin droplets 120 are partially cured in a heated container 130 to a gel state 140, carried in the continuous phase liquid stream 112 to a cured droplet re-coater 150 where the desired enhancement particles 160B are introduced into the continuous phase liquid stream 114 and allowed to mix with and bind to the partially cured gelatinous droplets to form liquid coated solid resin droplets 170 with coated particles attached. The amount of particles binding to the surface of the gel droplets can be controlled by the amount of particles 160B added to the continuous phase liquid stream and the amount of time the droplets are allowed to spend in the particle laden liquid stream 114 flow. At this stage the partially cured, particle encrusted droplets are sent through another heated container 180 curing cycle, such as, but not limited to open flame, electric heating elements or electromagnetic radiation such as infrared or microwaves to produce cured, coated resin droplets with particles attached 190. Another embodiment of this invention includes diverting the partially cured gelatinous droplets 170 with coating particles attached, to a further recoating step where an additional layer of the same pre-catalyzed resin or a different pre-catalyzed resin is applied over the particle laden surface of the partially cured gelatinous droplets. This has the effect of further anchoring and sealing in the enhancement particles 160B.

In the present invention, the enhancement particles 160 and 160B can be the same material or can be different materials, depending on the desired properties and end-use of the ceramic particles or beads.

After recoating, the droplets can then be sent through another curing cycle in a heated chamber, such as, but not limited to open flame, electric heating elements or electromagnetic radiation such as infrared or microwaves to produce cured, coated resin droplets with particles attached. If it is desired to not recoat the particle encrusted partially cured droplets then they can be sent to a final curing cycle in a heated chamber 180, as shown in FIG. 1. Once cured, the particle enhanced solid droplets can be immediately pyrolyzed into ceramic beads or they can be recoated with the original or different catalyzed resin then packed into a mold then cured in a heated chamber, such as, but not limited to open flame, electric heating elements or electromagnetic radiation such as infrared or microwaves to produce bulk green bodies which are then pyrolyzed into bulk ceramic components.

The present application is a Continuation-in-part of U.S. patent application Ser. No. 14/598,658 filed Jan. 16, 2014 that describes producing particles in a hot, non-reactive bath via an emulsion. Emulsions are different from the Sol-gel and Flame pyrolysis used to make typical ceramic particles. Advantages of emulsion over flame pyrolysis include consistency of particle shape, better control of particle size, and the advantage that particles can be shaped and chemically and materially augmented in the polymeric state. Advantages of Emulsions over typical Sol-gel particle formation include less time for gelation, simplification of drying process for production of bulk components, stable solutions over time and the advantage that particles can be shaped and chemically, and materially augmented in the polymeric state before ceramization. Other considerations include the fact that the Sol-gel process generally makes particles with porosity. This process produces particles with very smooth surfaces that are fully dense in the native state at sizes and compositions that cannot be made with Sol-gel.

FIG. 2 shows a process for making polymer derived ceramic (PDC) particles using a spray process. The production of enhanced ceramic particles via the spray process begins by direct injection of a liquid pre-catalyzed polymeric ceramic precursor resin 200 into a drop tower 210 that is heated by radiant energy 220, such as, heat radiated via open flame, electric heaters, or electromagnetic radiation such as infrared or microwaves. Enhancement particles 250 can the added to the liquid precursor resin 200 at this stage of the process to incorporate functional materials in the precursor resin to produce a unique, functionalized composition. The injection of the precursor resin 200 with or without the enhancement particles 250 can be by a spray nozzle however the preferred embodiment is to use an ultrasonic powered droplet generator 2. The use of such a generator allows for the production of liquid droplets with a very tight size distribution and in high volume.

As the liquid droplets 230 fall through the drop tower 210, surface tension pulls them into nearly perfect spheres. Air currents are injected into the drop tower to keep the droplets from hitting the tower walls and to control the speed of their descent through the tower. Depending on the temperature of the tower and the time spent in this part of the tower the droplets will be cured anywhere from 0% to approximately 90% or more.

A coating particle injector 240 containing enhancement particles 250B is positioned along a vertical side of the tower drop 210; the enhancement particles 250B are blown into the drop tower 210. The enhancement particles 250B are of a size such that when taking into account their density, that they can be made to flow around inside the drop tower 210 in a dust cloud state. This dust cloud of enhancement particles 255 then interacts with the falling partially cured resin droplets. In the event that the particles are cured to a gelatinous state by the time they encounter the dust cloud the particles can only adhere to the outer surface of the sticky droplets.

If the air currents and temperatures are set such that the liquid resin droplets 230 are still in a liquid state, the enhancement particles 250B will attach to and migrate into the body of the droplets in affect impregnating and filling the liquid droplets with particles. The amount of particles 250B inside each droplet 260 is controlled by the density of the dust cloud and the temperature of the drop tower 210.

As the coated or impregnated and filled droplets 260 continue down the tower they finish curing to a solid state. The cured particles 270 are then collected at the bottom of the drop tower 210.

The amount of enhancement particles 250B that bind to the outer surface of the liquid resin droplets 260 is controlled by the density of the dust cloud and the temperature of the drop tower. Once cured, the particle enhanced solid droplets can be immediately pyrolyzed into ceramic beads or they can be recoated with the original or different catalyzed resin then packed into a mold then cured in a similar cure cycle as above into bulk green bodies which are then pyrolyzed into bulk ceramic components.

Figure 2:
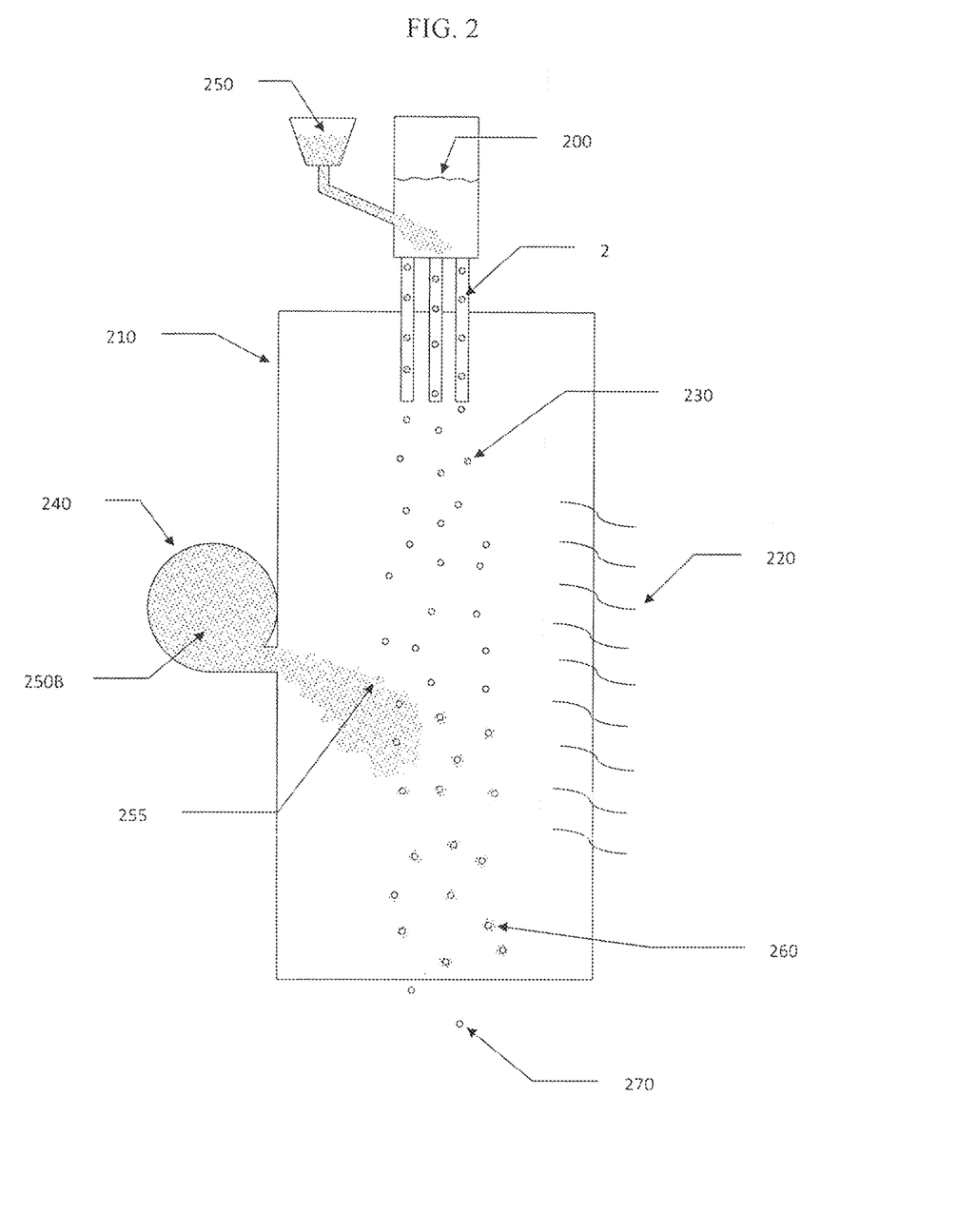
FIG. 2 shows a process for making polymer derived ceramic (PDC) particles using a spray process.

A determination as to whether the liquid resin droplets 230 are filled or coated can be made judiciously, depending on the vertical position of the coated particle injector 240 on the side of the drop tower 210, if positioned near the top where liquid resin 200 is injected into the drop tower, the enhancement particles 250 can be incorporated inside the resin droplets and if positioned midway or lower on the vertical side of the drop tower when the liquid resin droplets 230 are partially cured, the enhancement particles 250 are deposited on the outside of the droplets.

Another method of producing very small nano-scale particles would be to take the green body produced by the bulk technique and then cryogenically freezing this polymer mass. Then, through mechanical techniques such as cyromilling or other mechanical techniques, very small (less than one micron particles) could be produced by pulverizing the polymer in a frozen state. Once the frozen polymer is milled to the desired size it would then be pyrolyzed to ceramic. It is much more energy efficient than typical ceramic particle manufacturing where the milling process is performed on hard ceramic materials which produces extreme wear on the milling equipment.

When the functionalized globules are agglomerated together, the resultant bulk ceramics produced can be unique in that they would possess a multi-material structure virtually unobtainable by any other means. Such ceramics could be tailored to have higher strength, toughness, hardness or temperature resistance than ceramics with simpler structure.

Polymer Derived Ceramics are typically additive-free ceramic materials possessing excellent oxidation and creep resistance up to exceptionally high temperatures. The most known classes of PDCs are in the binary systems $Si_3N_4$, SiN, BN, and AlN, ternary systems SiCN, SiOC, and BCN as well as the quaternary systems of SiCNO, SiBCN, SiBCO, SiAlCN, and SiAlCO. See Colombo et al., Polymer-Derived Ceramics: 40 Years of Research and Innovation in Advanced Ceramics, *Journal of the American Ceramic Society*, Vol. 93, No. 7, 2010, pages 1805-1837. Any mention of SiOC in this memorandum will also mean the usage of these other types of polymer derived ceramics and their composite systems.

Table 1 shows Polymer Derived Ceramic systems with particle range size, applications and both density ranges.

with catalytic materials, they could be used to produce low cost, high temperature chemical reactors or catalytic converters.

Proppants

Other examples where the individual particles can be used include proppants for fracking oil and gas wells. In house testing of compression strength of the as fabricated SiOC beads that were in the target diameter range of approximately 354 to approximately 420 microns gave an average per bead load at failure of approximately 36 pounds. Applying Hertzian contact stress analysis to this load case gives a compression strength in excess of approximately 685,000 psi (approximately 4.73 Gpa) which exceeds that of alumina at approximately 453,000 psi (approximately 3.0 Gpa), $Si_3N_4$ at approximately 508,000 psi and silicon carbide at approximately 667,000 psi (approximately 4.6 Gpa). Beads of this strength would be expected to far exceed the industry benchmark "crush strength" of approximately 20,000 psi which represents beads made of high alumina. This data indicates that the SiOC particles should exceed a "crush strength" of approximately 30,000 psi.

Hybrid Bearings

A hybrid ball or roller bearing is defined as a non-metallic ball or roller in contact with a metal race. The non-metallic balls or rollers are typically silicon nitride, aluminum oxide, or other ceramic materials. Hybrid bearings provide the following benefits compared to traditional all-metallic ball or roller bearings: increased speeds, improved life, lower wear resistance, run at cooler temperatures, lower initial and life cycle costs, increased bearing life, non-magnetic, lightweight, reduces corrosion, improved electrical insulation (reduces electrical arcing), allows design to tighter tolerances, enables simplified lubrication systems, provides high modulus of elasticity, low coefficient of friction (reduced heat generation), and improves assembly rigidity.

SiOC ball blanks can be finished to grade 3, 5, 10 and 24 precision in diameter sizes ranging up to 4 mm. Many bearing applications fall into the small ball (ie. <approximately ⅛" or approximately 3 mm) diameter range. Two examples include dental drills/medical hand pieces (1 mm-1/16" diameter bearing balls) and hard disk drive spindles (1 mm-7/64" diameter bearing balls).

SiOC spheres possess ideal bearing ball properties. They are fully dense and will reduce wear and heat generation. The hardness of SiOC significantly extends bearing wear characteristics and the modulus of elasticity is greater than steel, which improves bearing rigidity. Minimal lubrication is required using SiOC bearings and lower torque can be

| | Particle Range | | Applicant | | Density | Specific |
|---|---|---|---|---|---|---|
| PDC System | Full Range | Narrow Range | Proppants Preferred | Ball Bearings Preferred | Range (g/cc) | Density (g/cc) |
| SiOC | 0.1-100 mm | 0.2-10 mm | 0.1-1.0 mm | 0.5-10 mm | 1.7-2.8 | 2.1-2.2 |
| SiCN | 0.1-100 mm | 0.2-10 mm | 0.1-1.0 mm | 0.5-10 mm | 1.85-2.3 | 2.1-2.3 |
| Si—Ti—C—O | 0.1-100 mm | 0.2-10 mm | 0.1-1.0 mm | 0.5-10 mm | 1.9-2.6 | 2.35 |
| Si—Al—C—O | 0.1-100 mm | 0.2-10 mm | 0.1-1.0 mm | 0.5-10 mm | 2.8-3.4 | 3.0-3.1 |
| Si—B—C—N | 0.1-100 mm | 0.2-10 mm | 0.1-1.0 mm | 0.5-10 mm | 1.80-2.3 | 2.1-2.3 |
| BN | 0.1-100 mm | 0.2-10 mm | 0.1-1.0 mm | 0.5-10 mm | 1.8-2.1 | 1.95 |
| Si—Al—O—N | 0.1-100 mm | 0.2-10 mm | 0.1-1.0 mm | 0.5-10 mm | 2.3-3.0 | 2.6 |
| SiC | 0.1-100 mm | 0.2-10 mm | 0.1-1.0 mm | 0.5-10 mm | 3.0-3.3 | 3.05 |

Applications of the PDCs

Depending on the functionalization, these ceramic particles or beads can be used to make inexpensive antibacterial water filters or if the particles are functionalized achieved due to low friction characteristics. SiOC is virtually inert and improved corrosion resistance compared to steel. The fully dense microstructure of SiOC allows extremely fine surface finishes of approximately 0.1 to approximately 0.2 Ra. Higher speeds can be achieved due to SiOC's low density and lightweight properties.

Adhesive wear is also reduced. Special properties include electrical insulation and it is non-magnetic. Besides SiOC, the technology described can make composites of SiOC as well as other systems made from PDC resins. Silicon nitride is the current ceramic ball bearing leader.

The PDC components of this invention have lower density, lower manufacturing costs, and higher compressive strength than the silicon nitride market leader as well as other standard ceramics.

A typical ball bearing ceramic process for silicon nitride ball bearings involves the milling of high purity raw materials mixed with binders. These powders are then spray dried creating a feedstock with excellent flowability and a range of particle sizes to ensure optical packing of molds. Spray dried powders are then carefully pressed under uniform pressure so that there are no density variations across the bearings and then prefired to remover binders. The prefired forms are then heated under pressure using a process called hot isostatic pressing or HIPing, using carefully predetermined heating schedules to optimize microstructural development for properties such as hardness, toughness, and rolling contact fatigue. The fired ceramic bearings are then lapped to final dimensions/geometry producing an excellent surface finish. "Silicon Nitride Ceramic Ball Bearings—Properties, Advantages and Applications." AZOM.com. N.P., 11 Jun. 2013. Web. 13 Sep. 2014.

Figure 3:
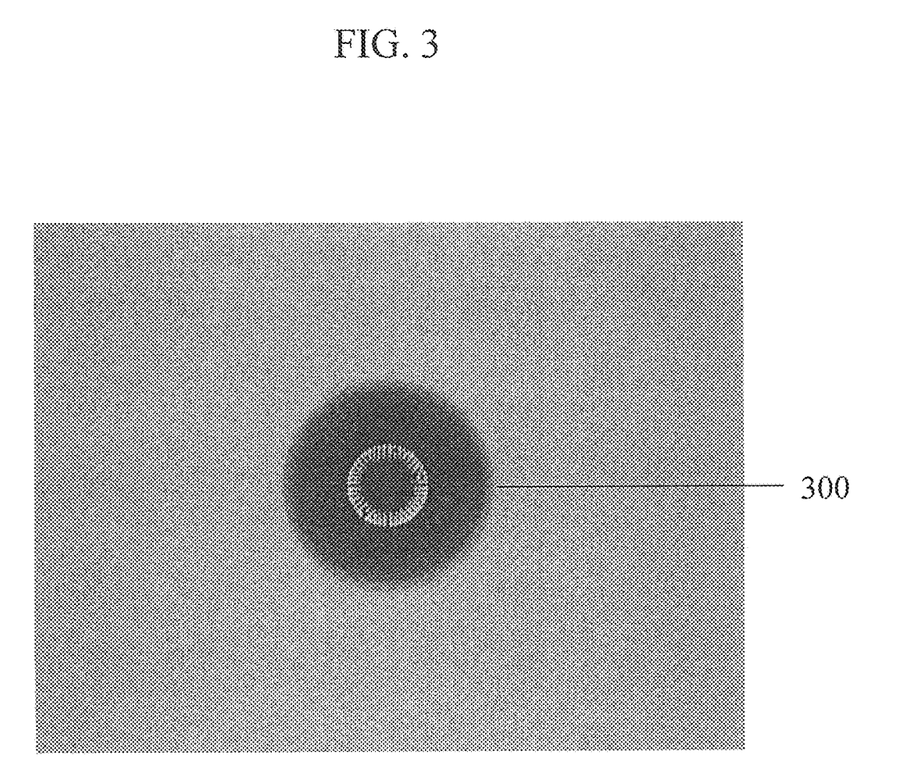
FIG. 3 shows an example of the quality and sphericity of a PDC particle made using the subject invention emulsion process.

FIG. 3 is photograph of a small ball bearing 300 made with the emulsion process disclosed in the present invention. The size is approximately 0.412 mm in diameter with a roundness of less than 0.018 mm. Using an Optical comparator (Smart Scope, ZIP Lite 250), a particle prepared by the present invention is affixed to a stage, a light source shines on it, and the resulting shadow image of the particle is magnified with lenses and bounced by mirrors, to be projected on the back of a screen for magnified viewing. The light source is Light Emitting Diodes (LEDs) wherein the LEDs are reflected back from the polished surface of a magnified particle 300. The Optical comparator, distributed by Optical Gaging Products, Inc., shows a smooth, glossy, mirror-like surface finish which was an incredible outcome without mechanical shaping or polishing. In addition, the particles are substantially, perfectly spherical and suitable for use as ball bearings and are much cheaper than the current process for preparing silicon nitride ball bearings in terms of thermal energy, manufacturing steps, and mechanical shaping time and expense.

Figure 4:
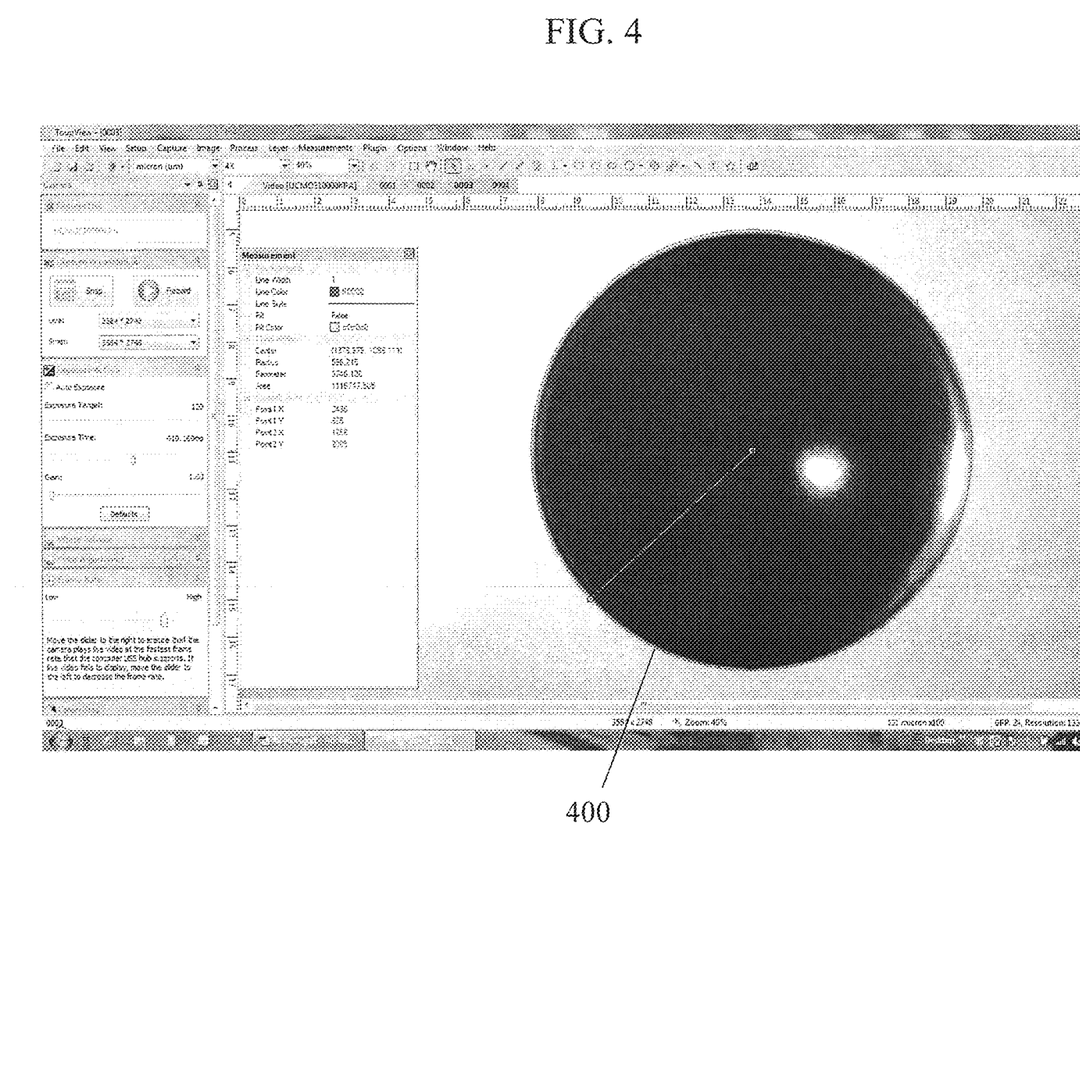
FIG. 4 shows a SiOC particle according to the invention of approximately 1.192 mm in diameter.

FIG. 4 is a high resolution image of a SiOC ceramic particle 400 prepared by the emulsion process of the present invention showing a completely spherical particle measuring approximately 1.192 mm in diameter.

Figure 5:
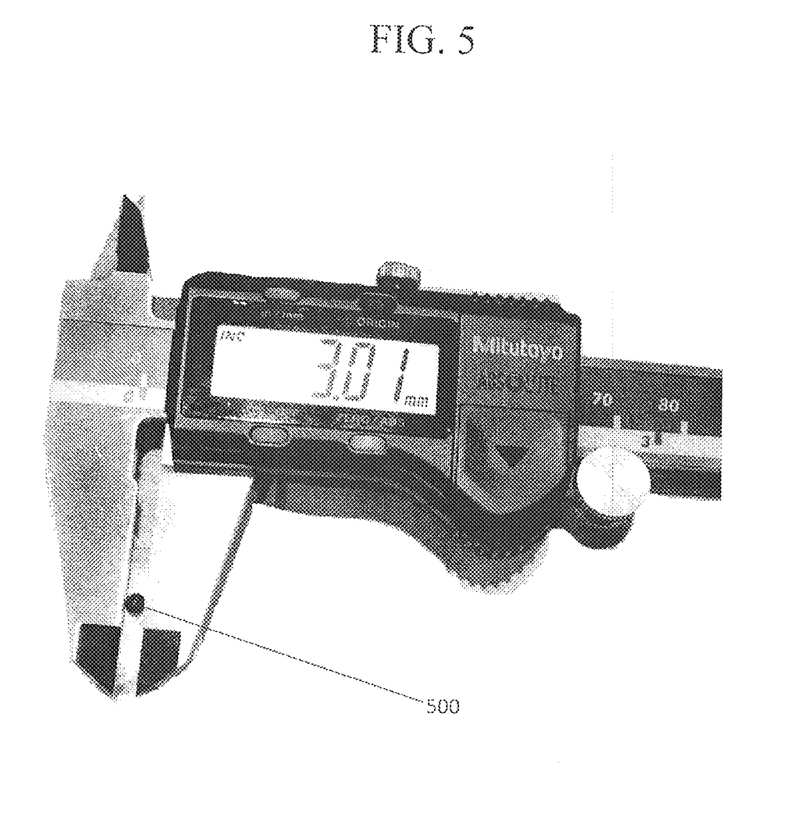
FIG. 5 shows a SiOC ceramic particle according to the invention of approximately 3.01 mm in diameter.

FIG. 5 is a fully dense, spherical SiOC ceramic particle 500 prepared according to the invention measuring approximately 3.01 mm in diameter.

Dispersion and Grinding Media

Ceramic grinding and dispersion media can be used for particle size reduction and typically produced from hard, wear-resistant ceramic materials such as zircon, alumina, and various alloys of zirconia. Grinding media can also be produced from the following materials: sand, plastics, glass, steel and tungsten carbide. Typical geometries for ceramic media included spheres, banded spheres, and cylinders. Spherical geometries are very common and are also known as beads.

Grinding media and dispersion media can be used in the manufacturing of paints, automotive coatings and inks, pigments, ores, minerals, a broad range of ceramic powders for electronic applications (ie. manufacturing of dielectrics), food processing, agrochemicals, and pharmaceuticals to name a few examples. Ceramic grinding media is commonly used in various equipment such as high energy mills, horizontal & vertical mills, vibratory mills, balls mills, and basket mills.

Hard ceramic materials exhibit high crush strength and wear resistance. Alloys of zirconia possess high density and crush strength as well as relative inertness to most acidic and alkali fluids. It is frequently used in aqueous based processes, especially in high speed agitation mills. The characteristically higher mass of zirconia provides the greater power (kinetic energy) needed by automotive coating and ink formulations, including the processing of highly viscous materials.

The properties of SiOC can be tailored to meet the requirements of most grinding media applications. Zirconia grinding media is ideal for surviving harsh conditions. Standard sizes for ceramic grinding media beads ranges from approximately 0.03 to approximately 2.4 mm in diameter.

The ideal ceramic grinding and dispersion media exhibits the highest wear resistance at the lowest cost per lbs or Kg with a tailored density for the application. Properties include:

High density provides a larger impact force which results in superior grinding efficiency.

High surface finish, roundness, sphericity, and a narrow size distribution produces higher productivity grinding and dispersion.

Made from high purity materials, which results in higher wear resistance and minimal contamination from media wear.

Inert and corrosion resistant

Ceramic Media for Surface Treatment and Cleaning

Ceramic media can be used for surface processing of a broad range of substrate materials—from hard steel to light alloys, polymers, and ceramics. Zirconium silicate for example, can be used for surface cleaning rubber and plastic molds, castings, boiler and heat exchanger parts, shot peening of various parts, cleaning nuclear reactor components, deburring a broad range of metal parts, and surface preparation of metal parts.

Ceramic beads perform efficiently in dry or wet pressure blasting systems and in multi-turbine blasting equipment. Ceramic media reduces dust emissions, maintains their round shape, smooth surface finish, and high strength. Ceramic media is chemically inert, corrosion resistant, and does not contaminate the substrate that is being processed. This invention will provide the means for alternate ceramic and/or ceramic composites.

Catalyst Cracking

Ceramic beads made from aluminium oxide ($Al_2O_3$) can be used in catalysts for petroleum cracking. This invention will supply alternatives which may improve catalytic performance.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A polymer derived ceramic (PDC) particle formed in a spraying, process for producing bulk ceramic components from an agglomeration of partially cured polymer ceramic precursor resin material, comprising:
a plurality of partially-cured globules of polymer ceramic precursor material co-sprayed with a plurality of metallic powder particles that are fillers incorporated in the structure of the partially-cured globules of polymer ceramic precursor material that is subsequently fully cured, chemically bonded together, then fired to melt or sinter the metallic powder particles and produce a uniform, non-porous, fully-dense, single, continuous metal ceramic composite part having a particle size of approximately 1.2 mm to approximately 300 mm in diameter.

2. The polymer derived ceramic (PDC) particle of claim 1, wherein the plurality of metallic powder particles in the structure of the partially-cured globules of polymer ceramic precursor material includes at least one of a first coating of a first functional material coated on the surface of the partially-cured globules of precursor material or a second coating of a second functional material coated on the surface of a fully cured polymer ceramic precursor material having the first coating of the first functional material, thereby forming a functionally enhanced multilayered metal ceramic particle.

3. The polymer derived ceramic (PDC) particle of claim 2, wherein the functional material is selected from at least one of a metallic powder, a ceramic powder, graphite powder, graphene powder, diamond powder, carbide powder, silicide powder, nitride powder, oxide powder, carbon nanotubes and mixtures thereof.

4. The polymer derived ceramic (PDC) particle of claim 1, the particle having a density range of approximately 1.7 to 3.4 g/cc.

5. The polymer derived ceramic (PDC) particle of claim 1, wherein the particle is fully cured, then pyrolyzed to form a metal ceramic proppant.

6. The polymer derived ceramic (PDC) particle of claim 1, wherein the particle is fully cured, then pyrolyzed to form a metal ceramic ball bearing.

7. The polymer derived ceramic (PDC) particle of claim 1, wherein the ceramic particle is derived from a SiOC PDC system.

8. A fully-dense, spherical polymer derived ceramic (PDC) particle formed in an emulsion process for producing bulk ceramic components from partially cured polymer ceramic precursor resin droplets comprising:
a plurality of partially-cured globules of polymer ceramic precursor material having a plurality of metallic powder particles incorporated in the structure of the partially-cured globules of polymer ceramic precursor material that is pressed into a spherical mold, subsequently fully cured, chemically bonded together, then pyrolyzed to melt or sinter the metallic powder particles and produce a uniform, non-porous, fully dense, functionalized metal ceramic particle having a diameter of approximately 1.2 mm to approximately 300 mm in diameter.

9. The fully-dense, spherical polymer derived ceramic (PDC) particle of claim 8, wherein the ceramic particle is derived from a SiOC PDC system.

10. The ceramic particle of claim 9, wherein the particle has a diameter of approximately 3.01 mm.

* * * * *